UNITED STATES PATENT OFFICE.

JOHN REICHEL, OF PHILADELPHIA, AND HENRY WERNER, OF GLEN OLDEN, PENNSYLVANIA, ASSIGNORS TO H. K. MULFORD COMPANY, OF PHILADELPHIA, PENNSYLVANIA, A CORPORATION OF PENNSYLVANIA.

PROCESS OF FILTERING HOG-CHOLERA ANTITOXIN WITH THE AID OF CHEMICALS AND A COMPOSITION OF MATTER RELATED TO THE PROCESS.

1,192,559.     Specification of Letters Patent.     Patented July 25, 1916.

No Drawing.     Application filed December 15, 1915. Serial No. 66,908.

*To all whom it may concern:*

Be it known that we, JOHN REICHEL, a citizen of the United States, residing in Philadelphia, in the county of Philadelphia and State of Pennsylvania, and HENRY WERNER, a subject of the King of Great Britain, residing in Glen Olden, county of Delaware, State of Pennsylvania, have invented a new and useful Improvement in Processes of Filtering Hog-Cholera Antitoxin with the Aid of Chemicals and a Composition of Matter Related to the Process, of which the following is a specification.

This invention relates to a new and useful process of filtering hog cholera antitoxin with the aid of chemicals, and has for an object, among others, to obtain hog cholera antitoxin, freed of any insoluble inert material in suspension.

The invention relates also to a new and useful composition of matter or mixture, related to the process above identified.

In carrying out the process, hog cholera antitoxin may be used in the form of serum, plasma, or defibrinated blood partially or completely prepared, fresh, sterile, preserved or otherwise, and therefore the process in practice is not to be considered a restriction to any particular prepared form or step in the production of hog cholera antitoxin.

Injections of virulent blood or virus from a hog sick of hog cholera or the cause of hog cholera into an animal immune from hog cholera produces in the blood of an immune animal an antitoxin or hog cholera immune bodies or antibodies which may be obtained or drawn off in the form of a serum, plasma or defibrinated blood containing the immune substances, and, aside from the watery portion, other substances, such as, the globulins and serum albumins in solution, and the insoluble, inert material, including fibrin, cellular debris and germs in suspension. It is to the hog cholera antitoxin obtained in this way (see the Marion Dorset United States Patent, No. 823,110, June 12, 1906), or to hog cholera antitoxin obtained in other ways that our new and useful process relates, more particularly when the process is carried on in the following treatment steps with hog cholera antitoxin in order to filter out the insoluble, inert material in suspension.

The process is preferably carried out by taking a definite amount or quantity of hog cholera antitoxin, serum, plasma or defibrinated blood, as above identified, and treating it with the chemical, calcium citrate, either in crystalline form, powder, or in solution. After thoroughly mixing the chemical and antitoxin, the mixture is allowed to stand for approximately twenty four to forty eight hours. The mixture may then be placed on a filtering surface of paper, cloth or other material, and allowed to filter with or without pressure or vacuum. The hog cholera antitoxin or filtrate thus obtained can subsequently be forced through finer grades of filtering material, as for example hard filter paper and then the citrate can be forced through sterilizing filters to remove the smallest particles of insoluble, inert material in the form of germs in suspension. As the result of this manner or process of treatment, the insoluble inert material in suspension can be eliminated or removed by filtration, without affecting the active substances and soluble portion of the hog cholera antitoxin, including the globulins and serum albumin. We prefer to use from thirty-five to forty grams of calcium citrate for each one thousand (1000) cubic centimeters of hog cholera antitoxin, or the amount of sodium citrate in the proportion of seventy five (75) grams of the salt to one thousand (1000) cubic centimeters of hog cholera antitoxin and twenty five (25) grams of calcium chlorid added separately or together at one and the same time, which will produce the same or substantially the same effect as the addition of the partially soluble salt, calcium citrate. It will be observed that calcium citrate, as calcium citrate, can be added to the hog cholera antitoxin, in the proportions described or that sodium citrate and calcium chlorid, in the proportions described, can be added separately or together to the hog cholera antitoxin, in treating the same, so as to facilitate filtration and assist in the removal of the insoluble inert material contained in the whole mixture.

Other chemicals in the form of salts, or chemical agents in the form of a salt in solution or otherwise, than those herein called by name, which chemical or chemical agent is itself practically insoluble in hog cholera antitoxin or forms a practically soluble or insoluble salt and which will not precipitate any of the soluble constituents of hog cholera antitoxin, can be used as an equivalent or instead of the chemicals or chemical agents named, for the purpose herein disclosed; therefore, it is understood that the invention is not to be limited to the use of the chemicals mentioned by name, since they have been mentioned, by way of example, as some of the chemicals that can be used in carrying out the process, and furthermore, that the description of the process, specifically, is that of the preferred mode of treatment; but the invention generally is not necessarily to be limited thereto, since it is plain that the invention disclosed is susceptible to modification in various particulars by persons skilled in the art without departing from the spirit or scope of the invention disclosed and hereinafter claimed.

What we claim and desire to secure by Letters Patent of the United States is:—

1. In the art of treating hog cholera antitoxin, to obtain the same freed of insoluble inert material, the step of adding to a definite amount or quantity of hog cholera antitoxin as an admixture therewith of a chemical to provide insoluble salt crystals in the antitoxin to separate the cellular debris, substantially as disclosed.

2. In the art of treating hog cholera antitoxin to obtain the same freed of insoluble inert material, the admixture therewith comprising the addition of solution of salts capable of reacting to provide insoluble crystals within the antitoxin to separate the cellular debris to facilitate filtration, substantially as disclosed.

3. The art of treating hog cholera antitoxin to facilitate filtration of the same to free the same of insoluble inert material in suspension and obtain the liquid portion, comprising the admixture therewith of sodium citrate in the proportion substantially of seventy-five grams of salt to one thousand cubic centimeters of hog cholera antitoxin and twenty-five grams of calcium chlorid, substantially as herein described.

4. As a new composition of matter, a mixture of a definite amount or quantity of hog cholera antitoxin and calcium citrate, in suitable proportion, as disclosed, to facilitate filtration of the composition and assist in the removal of the insoluble inert material contained in the mixture.

5. As a new composition of matter, a mixture of a definite amount or quantity of hog cholera antitoxin and calcium citrate in the proportion substantially of seventy-five grams of the sodium citrate to one thousand cubic centimeters of hog cholera antitoxin and twenty-five grams of calcium chlorid, to facilitate filtration of the composition and assist in the removal of the insoluble inert material, substantially as described.

In testimony whereof we have signed our names to this specification in the presence of two subscribing witnesses.

JOHN REICHEL.
HENRY WERNER.

Witnesses:
W. H. QUILLMAN,
G. JONES.